US006959342B1

(12) United States Patent
Gipp et al.

(10) Patent No.: US 6,959,342 B1
(45) Date of Patent: Oct. 25, 2005

(54) REPLICATING KERNEL DATA THAT IS READ MOSTLY AND WRITE RARELY

(75) Inventors: Stephan Kurt Gipp, Inver Grove Heights, MN (US); Aaron Forest Godfrey, Eagan, MN (US)

(73) Assignee: Cray, Inc., Seattle, WA (US)

( * ) Notice: Subject to any disclaimer, the term of this patent is extended or adjusted under 35 U.S.C. 154(b) by 201 days.

(21) Appl. No.: 10/643,739

(22) Filed: Aug. 18, 2003

(51) Int. Cl.⁷ .............................................. G06F 13/00
(52) U.S. Cl. ..................... 710/1; 710/4; 710/7; 710/20; 710/21; 710/33
(58) Field of Search .............................. 710/1, 4, 7, 20, 710/21, 33

(56) References Cited

U.S. PATENT DOCUMENTS

| | | | |
|---|---|---|---|
| 5,175,842 A | * | 12/1992 | Totani ........................ 711/161 |
| 5,363,498 A | * | 11/1994 | Sakuraba et al. ........... 711/147 |
| 6,336,160 B1 | * | 1/2002 | Eickemeyer et al. ........... 711/1 |

* cited by examiner

Primary Examiner—Jeffrey Gaffin
Assistant Examiner—Mohammad Farooq
(74) Attorney, Agent, or Firm—Schwegman, Lundberg, Woessner & Kluth, P.A.

(57) ABSTRACT

A distributed computer system and a method for replicating data in a distributed computer system. The system includes a plurality of processing nodes. A processing node comprises at least one processor and at least one local memory, where the local memory is in communication with each processing node. The system also includes maintenance software to determine whether data is read substantially more frequently than it is written and to replicate the data that is read substantially more frequently than it is written among the plurality of processing nodes. The method includes reviewing classes of data, identifying whether at least a portion of data of a certain class used by the processing nodes is read substantially more frequently than it is written and replicating copies of the data of that class in the local memories.

20 Claims, 3 Drawing Sheets

REPLICATING KERNEL DATA THAT IS READ MOSTLY AND WRITE RARELY

TECHNICAL FIELD

This document relates generally to multi-processor computer systems and in particular to a system and method of replicating data on multiple computing nodes within a computing system.

BACKGROUND

Multi-processor computer systems include a number of processing nodes connected together by an interconnection network. Typically, a processing node includes one or more processors, a local memory, a cache memory and an interface circuit connecting the node to the interconnection network. The interconnection network is used for transmitting packets of information between processing nodes.

In computer systems it is important to minimize the time necessary for processors to access data. In a distributed memory system, communication costs in reading data from remote memory locations can be excessive. To solve this problem, computer memory systems generally use a memory hierarchy in which smaller and faster memories are located within a few machine cycles of the processors and larger and slower memories are located a larger number of machine cycles away. Cache memories are smaller, faster memories that contain a copy of memory data that is used more often by the processors. Data in a cache memory is stored in memory blocks that contain both the data and a tag that identifies the data. If the desired data is not located in cache memory, a cache miss occurs and the data is fetched from local memory.

However, there isn't always enough room in each local memory to store all global variables. Higher communication costs are incurred if a global variable for use on a first processing node resides in local memory on a second processing node. What is needed is an improved method of data access in a multi-processor node system to optimize system performance.

SUMMARY

This document discusses a distributed computer system and a method for replicating data in a distributed computer system.

The system includes a plurality of processing nodes. A processing node comprises at least one processor and at least one local memory, where the local memory is in communication with each processing node. The system also includes maintenance software, to determine whether data is read substantially more often than it is written and to replicate the data that is read substantially more frequently than it is written among the plurality of processing nodes.

The method includes reviewing classes of data, identifying whether at least a portion of data of a certain class used by the processing nodes is read substantially more frequently than it is written and replicating copies of the data of that class in the local memories.

This summary is intended to provide an overview of the subject matter of the present application. It is not intended to provide an exclusive or exhaustive explanation of the invention. The detailed description is included to provide further information about the subject matter of the present patent application.

BRIEF DESCRIPTION OF THE DRAWINGS

In the drawings like numerals refer to like components throughout the several views.

DETAILED DESCRIPTION

In the following detailed description, reference is made to the accompanying drawings which form a part hereof, and specific embodiments in which the invention may be practiced are shown by way of illustration. It is to be understood that other embodiments may be used and structural changes may be made without departing from the scope of the present invention.

This detailed description discusses a system and method for distributing data to multiple computing nodes in a distributed computer system. The computing nodes typically include processors, cache memories and a local memory.

Figure 1:
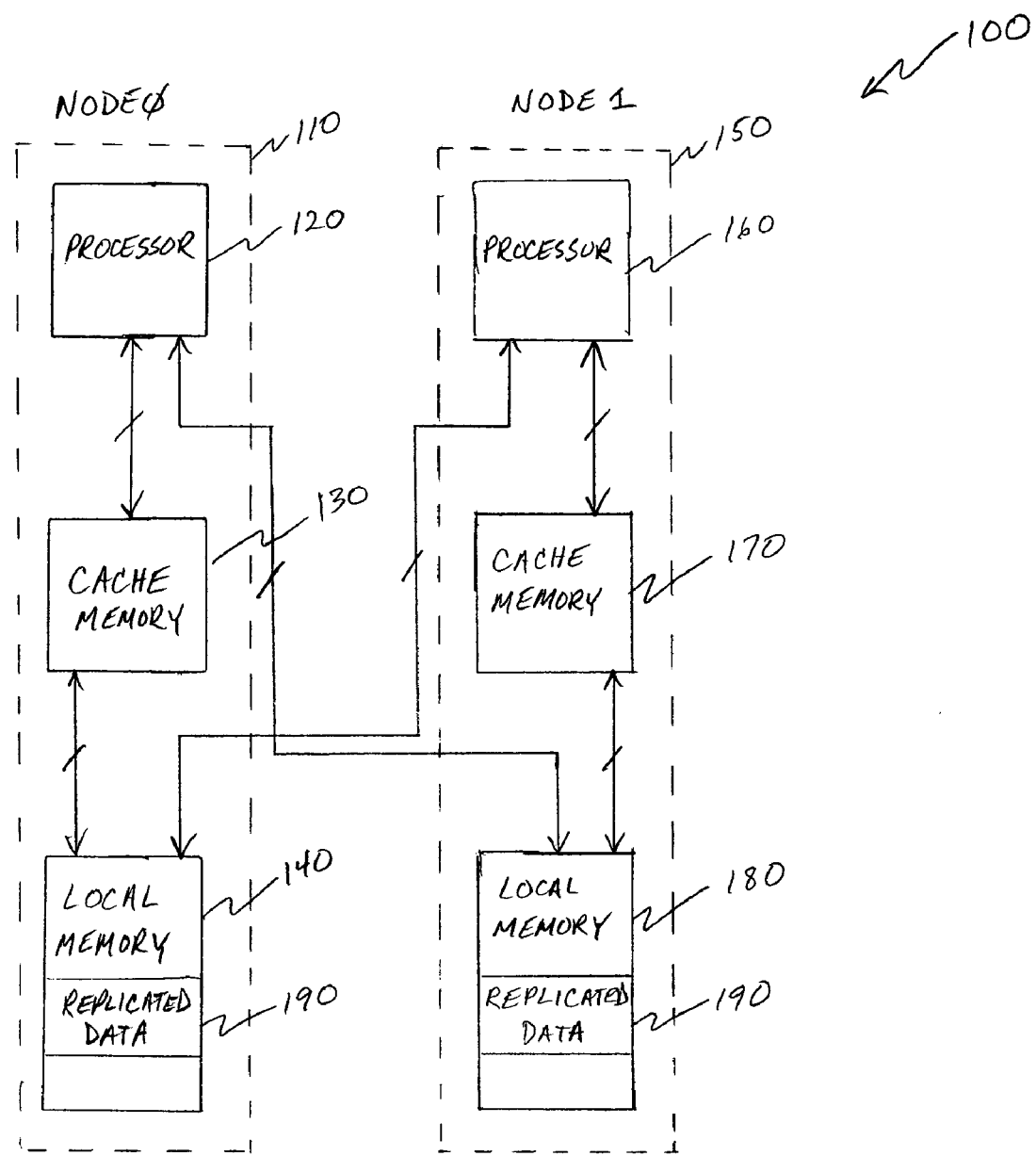
FIG. 1 shows an embodiment of a multi-processor computer system.

FIG. 1 shows one embodiment of a multi-processing node computer system 100. The computing nodes 110, 150 include processors 120, 160, cache memories 130, 170 and a local memory 140, 180. In one embodiment, the local memories 140, 180 comprise a global address space. Cache memory 130 is dedicated to the processor or processors 120 in node 110. If processor 120 needs data residing in node 150, processor 120 retrieves the data from the local memory 180 in node 150. Likewise, if processor 160 needs data residing in node 110, processor 160 retrieves the data from the local memory 140 in node 110. If data is identified that is substantially read more frequently than it is written, the data can be replicated and placed in the local memories 140, 180. When the replicated data 190 is needed by a processor, the processor accesses the node local memory 140, 180 and does not need to wait the extra machine cycles for an inter-node access.

If cache memory is used for data access between processing nodes 110, 150, or inter-node accesses, communication cost in handling cache traffic can greatly impact a computer system. Consider, for example, a computer system that includes many processing nodes 110, 150 where each processing node includes multiple processors. If processors 120, 160 are allowed to execute inter-node data accesses directly to the cache memories 130, 170 in other nodes, broadcasting data among the many nodes to maintain cache coherence will negatively impact system performance. For this reason, inter-node accesses are often made through the local memories 140, 180. System performance is negatively impacted if processing nodes have to execute a large number of machine cycles to access data residing the local memories of other processing nodes. If it is determined that a number of these accesses are to data that is substantially read more frequently than the data is written, machine cycles can be saved if this data is replicated 190 among all the local memories by eliminating the extra machine cycles needed to access the local memory of other processing nodes.

One embodiment of data that falls within this class is data written as a result of an external event, such as a result of a system operator changing a computer system parameter. Another embodiment of this class of data is data written automatically, but as a result of a rare event such as a processor going down. Examples of the embodiments include system tunable parameters such as how much extra processor time applications are granted once a processor time limit was exceeded, address lookup tables that allow one processor to look up data specific to another processor such as processor run-queue data, and configuration data written at system boot-up time such as host names. In one embodiment, the replicated data 190 includes data structures. In another embodiment, the replicated data 190 includes portions of data structures.

Figure 2:
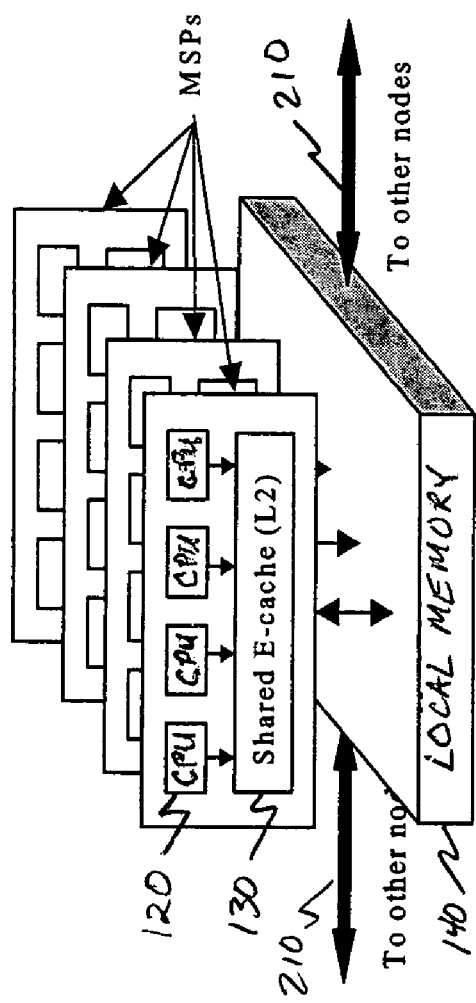
FIG. 2 shows an embodiment of a multiprocessor computer node.

FIG. 2 shows an embodiment of a multiprocessor computer node 200. The node includes sixteen processors 120. Four of the processors 120 share a cache memory 130. The node 200 also includes local memory 140. In another embodiment, the cache memory 130 includes four cache memories shared by four processors 120. Thus, in the embodiment, the multiprocessor node includes a total of sixteen cache memories 130. In a computer system having many multiprocessor nodes 200, the local memories are in communication with each other through an interconnection network 210.

When the replicated data 190 needs to be updated, the updated data is distributed, or broadcast, to all of the local memories 140 of the nodes where the replicated data 190 resides. In one embodiment, the replicated data 190 resides only on a portion of the local memories 140 in a multi-node computer system 100.

To distribute the data, the computing system 100 includes maintenance software to write data to remote locations. In one embodiment, the maintenance software is included with an operating system running on one or more of the nodes. In another embodiment, the maintenance software is included with applications that run on the system. In yet another embodiment, the data that is to be replicated 190 is identified before an application executes, and the maintenance software replicates the data 190 before such applications execute on the system 100. In yet another embodiment, all of the data 190 to be replicated is not known beforehand, and the maintenance software recognizes data that is read substantially more often than it is written and replicates the data 190 as an application is running.

Figure 3:
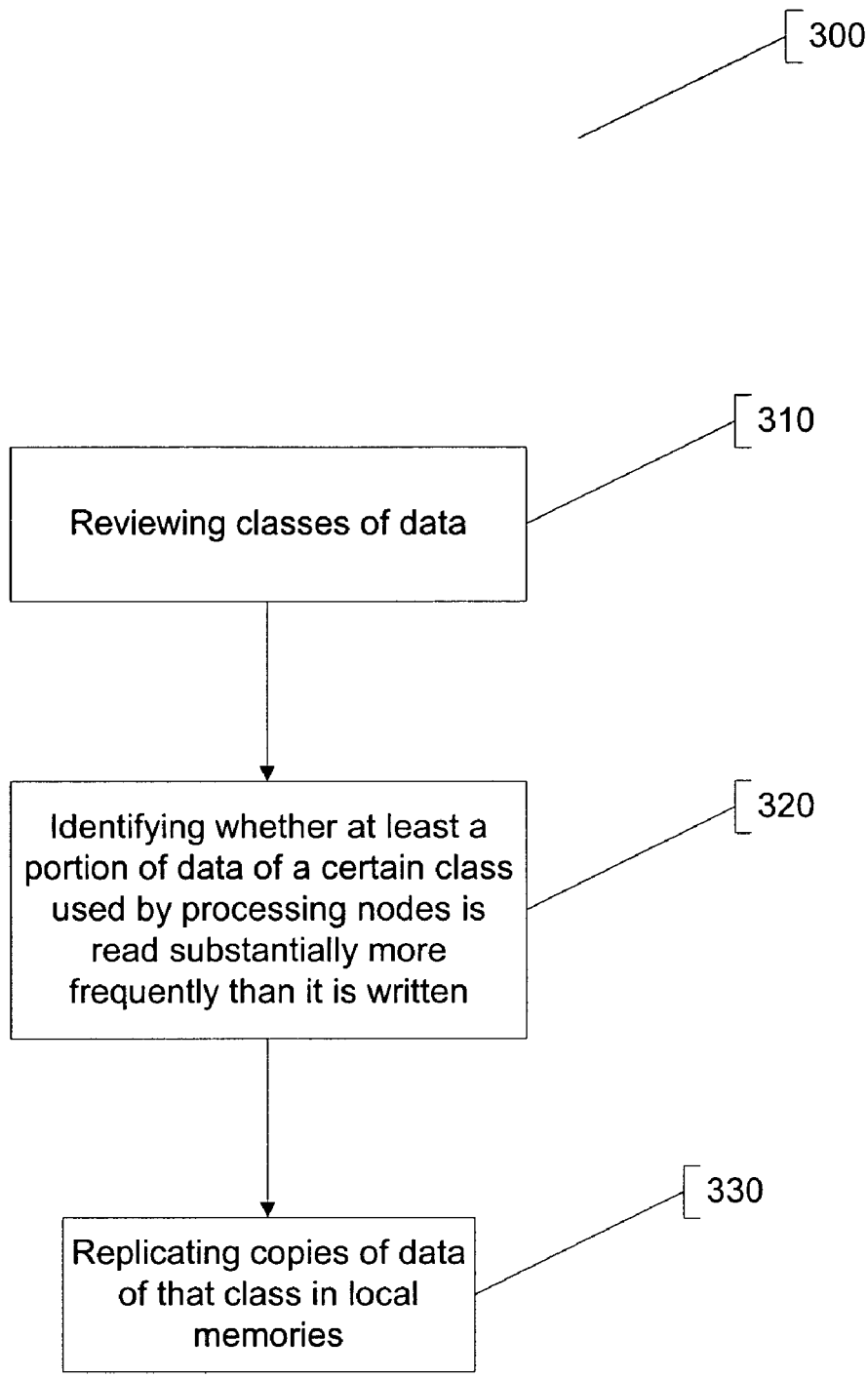
FIG. 3 shows an embodiment of a method for replicating data in a multiprocessor system.

FIG. 3 shows an embodiment of a method 300 for replicating data in a multiprocessor system that includes multiple processing nodes in communication with local memories. At 310, classes of data are reviewed. At 320, it is identified whether at least a portion of data of a certain class used by the processing nodes is read substantially more frequently than it is written. At 330, copies of the data of that class are replicated in the local memories. In one embodiment, determining whether data is read substantially more frequently than it is written is performed at an operating system level as applications are running. In one embodiment, replicating the data includes executing applications in one or more processing nodes to replicate the data.

Although specific examples have been illustrated and described herein, it will be appreciated by those of ordinary skill in the art that any arrangement calculated to achieve the same purpose could be substituted for the specific example shown. This application is intended to cover any adaptations or variations of the present invention. Therefore, it is intended that this invention be limited only by the claims and their legal equivalents.

What is claimed is:

1. A computer system comprising:
 a plurality of processing nodes, wherein a processing node comprises:
  at least one processor; and
  at least one local memory, the at least one local memory in
  communication with each processing node; and
 maintenance software, wherein the maintenance software determines whether data is read substantially more frequently than it is written and replicates the data that is read substantially more frequently than it is written among the plurality of processing nodes.

2. The system of claim 1, wherein a first processing node reads data from a second processing node by reading local memory at the second processor node.

3. The system of claim 1, wherein the memories comprise a global address space.

4. The system of claim 1, wherein the data includes data written as a result of an event external to the system.

5. The system of claim 1, wherein the data includes at least portions of data structures.

6. The system of claim 5, wherein the maintenance software broadcasts new data to the processing nodes when the data needs to be updated.

7. The system of claim 1, wherein the data is distributed to only a portion of the plurality of local memories.

8. The system of claim 1, wherein the maintenance software is included as part of an operating system.

9. The system of claim 1, wherein the maintenance software is part of applications running on the system.

10. The system of claim 1, wherein the plurality of processing nodes includes four processing nodes.

11. The system of claim 1, wherein the at least one processor includes sixteen processors.

12. The system of claim 1, wherein the at least one cache memory includes sixteen cache memories.

13. In a computer system having multiple processing nodes, the processing nodes in communication with local memories, a method comprising:
 reviewing classes of data;
 identifying whether at least a portion of data of a certain class used by the processing nodes is read substantially more frequently than it is written; and
 replicating copies of the data of that class in the local memories.

14. The method of claim 13, wherein the local memories are part of a global address space and wherein replicating includes writing the data in locations within the global address space.

15. The method of claim 13, wherein replicating includes broadcasting the data to the local memories if the data needs updating.

16. The method of claim 13, wherein replicating copies in local memories includes distributing copies of the data to only a portion of the local memories in the computer system.

17. The method of claim 13, wherein determining whether data is read substantially more frequently than it is written is performed at an operating system level as applications are running.

18. The method of claim 13, wherein replicating copies of the data in local memories includes distributing copies of the data to local memory using an operating system.

19. The method of claim 13, wherein replicating copies of the data in local memories includes executing applications in one or more of the processing nodes to replicate copies of the data in the local memory.

20. The method of claim 13, wherein replicating copies of the data includes replicating at least portions of data structures.

* * * * *